United States Patent
Russo et al.

(10) Patent No.: US 9,411,049 B2
(45) Date of Patent: Aug. 9, 2016

(54) PROXIMITY SENSOR HAVING ARRAY OF GEIGER MODE AVALANCHE PHOTODIODES FOR ESTIMATING DISTANCE OF AN OBJECT TO THE ARRAY BASED ON AT LEAST ONE OF A DARK CURRENT AND A RATE OF CURRENT SPIKES GENERATED IN DARK CONDITIONS

(71) Applicant: STMICROELECTRONICS S.r.l., Agrate Brianza (IT)

(72) Inventors: Alfio Russo, Biancavilla (IT); Massimo Cataldo Mazzillo, Corato (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 393 days.

(21) Appl. No.: 14/146,175

(22) Filed: Jan. 2, 2014

(65) Prior Publication Data
US 2014/0191114 A1    Jul. 10, 2014

(30) Foreign Application Priority Data

Jan. 9, 2013  (IT) ............................... M12013A0019

(51) Int. Cl.
G06M 7/00    (2006.01)
G01J 1/44    (2006.01)
(Continued)

(52) U.S. Cl.
CPC .................. G01S 17/026 (2013.01); G01J 1/44 (2013.01); G01S 17/08 (2013.01)

(58) Field of Classification Search
CPC ... G01J 2001/4466; G01J 1/44; G01S 17/026; G01S 17/08; G01S 17/89; G01T 1/248; G01C 3/08
USPC ........ 356/4.01, 5.01, 4.07, 3; 250/221, 559.4, 250/559.29, 206.1, 206, 214 R, 214.1, 250/214 A, 214 VT, 332, 208.1, 393
See application file for complete search history.

(56) References Cited

U.S. PATENT DOCUMENTS 5,592,523 A * 1/1997 Tuy ........................ A61B 6/032
                                                    250/370.09
7,301,608 B1 * 11/2007 Mendenhall .......... G01S 17/107
                                                    356/4.01
(Continued)

OTHER PUBLICATIONS

Akil et al., "A multimechanism model for photon generation by silicon junctions in avalanche breakdown", IEEE Transactions on Electron Devices, vol. 46, No. 5, May 1999, pp. 1-7.
(Continued)

*Primary Examiner* — Que T Le
*Assistant Examiner* — Jennifer Bennett
(74) *Attorney, Agent, or Firm* — Allen, Dyer, Doppelt, Milbrath & Gilchrist, P.A.

(57) ABSTRACT

A proximity sensor may include an array of Geiger mode avalanche photodiodes, each including an anode contact and a cathode contact. A common cathode contact may be coupled to the cathode contacts of the array to define a first connection lead at a back side of the array. A common anode collecting grid contact may be coupled to the anode contacts of the array to define a second connection lead of the array. Circuitry may be coupled with the first and second connection leads and configured to sense at least one of a dark current and a rate of current spikes generated in dark conditions, and generate an output signal representing an estimated distance of an object from the array upon the sensing.

15 Claims, 4 Drawing Sheets

(51) Int. Cl.
*G01C 3/08* (2006.01)
*G01S 17/02* (2006.01)
*G01S 17/08* (2006.01)

(56) References Cited

U.S. PATENT DOCUMENTS

| | | | | |
|---|---|---|---|---|
| 2010/0149646 | A1* | 6/2010 | Kim | G02B 1/11 359/601 |
| 2012/0051383 | A1* | 3/2012 | Stern | B82Y 20/00 372/50.21 |
| 2012/0068050 | A1 | 3/2012 | Mazzillo et al. | |
| 2012/0132788 | A1 | 5/2012 | Findlay | |

OTHER PUBLICATIONS

Sciacca et al.—Arrays of Geiger Mode Avalanche Photodiodes, IEEE Photonics Technology Letters, vol. 18, No. 15, Aug. 1, 2006, pp. 1633-1635.

Aull et al.—Geiger-Mode Avalanche Photodiodes for Three-Dimensional Imaging, Lincoln Laboratory Journal, vol. 13, No. 2, 2002, pp. 335-350.

Mazzillo et al.—Single Photon Avalanche Photodiodes Arrays, Sensors and Actuators A, vol. 138, 2007, pp. 306-312.

Rech et al.—Optical Crosstalk in Single Photon Avalanche Diode Arrays: A New Complete Model, Optical Society of America, Optics Express, Jun. 9, 2008, vol. 16, No. 12, pp. 8381-8394.

Mazzillo et al.—Silicon Photomultiplier Technology at STMicroelectronics, IEEE Transactions on Nuclear Science, vol. 56, No. 4, Aug. 2009, pp. 2434-2442.

Feuerbaum—Development of Calibration Methods for a Photon Emission Microscope to Analyse Light Emitted from Semiconductor Detectors, Thesis, The MPI Semiconductor Laboratory and the Physik-Department, Technische Universitat, Munchen, Jan. 2008, pp. 1-85.

Zappa et al.—Principles and Features of Single-Photon Avalanche Diode Arrays, Sensors and Actuators A 140, 2007, pp. 103-112.

Akil et al.—A Multimechanism Model for Photon Generation by Silicon Junctions in Avalanche Breakdown, IEEE Transactions on Electron Devices, vol. 46, No. 5., May 1999, pp. 1022-1028.

Lacaita et al.—On the Bremsstrahlung Origin of Hot-Carried-Induced Photons in Silicon Device, IEEE Transactions on Electron Devices, vol. 40, No. 3, Mar. 1993, pp. 577-582.

Mirzoyan et al.—Light Emission from Avalanches in Si, Aix-les-Bains, France, Jun. 17, 2008, pp. 1-18.

Niclass et al.—Design and Characterization of a CMOS 3-D Image Sensor Based on Single Photon Avalanche Diodes, IEEE Journal of Solid-State Circuits, vol. 40, No. 9, Sep. 2005, pp. 1847-1854.

Newman et al.—Visible Light from a Si P-N Junction, Abstract, American Physical Society, vol. 100, Issue 2, Oct. 2, 1955.

* cited by examiner

PROXIMITY SENSOR HAVING ARRAY OF GEIGER MODE AVALANCHE PHOTODIODES FOR ESTIMATING DISTANCE OF AN OBJECT TO THE ARRAY BASED ON AT LEAST ONE OF A DARK CURRENT AND A RATE OF CURRENT SPIKES GENERATED IN DARK CONDITIONS

FIELD OF THE INVENTION

This disclosure relates to proximity sensors, and, more particularly, to a proximity sensor based on Geiger Mode Avalanche Photodiodes (GMAPs), and a related method of sensing a distance of an object from a proximity sensor.

BACKGROUND OF THE INVENTION

Geiger Mode Avalanche Photodiodes (GMAPs) have been developed during recent years as a possible alternative to vacuum photomultiplier tubes (PMT) and other solid-state photodetectors. They have many advantages in terms of excellent single photon response, high gain at low bias voltage, high detection efficiency in the visible range, very fast timing response, good temperature and voltage stability, compactness and insensitivity to magnetic fields. Thanks to their properties, GMAPs have found widespread use for the detection of very weak and fast optical signals in many applications like astronomy, fluorescence and luminescence decay measurements, single-molecule detection, and laser ranging.

GMAPs are semiconductor junction diodes reverse-biased a few volts above the breakdown voltage. At this operating condition, the electric field within a GMAP depletion layer is so high that a single carrier injected in this region triggers a self-sustaining avalanche multiplication process. As a result, a sharp current pulse of a few mA and with a sub-nanosecond rise time is produced, thus marking a photon arrival. Once the breakdown current has been detected, it is quenched by a large series resistor (passive quenching) or by a suitable quenching circuit (active quenching). The photodiode is thus turned off for a suitable hold-off time that allows the charge stored within the depletion layer to dissipate. After this time, the reverse bias voltage is restored and the device is ready to detect another photon. Exemplary architectures of GMAP devices are disclosed in the Italian Patent application No. VA2010A000069 in the name of the same applicant, the whole disclosure of which is herein incorporated by reference.

A proximity or distance sensor is a sensor able to detect the presence of nearby objects without any physical contact. It usually includes an infrared pulsed light emitter (typically one or more LEDs) used to illuminate the object.

If no object is close to the sensor, the light is never reflected and the reading shows no object. If the light reflects off an object, it returns to the detector and determines a triangle. The angle identified by the emitter, the point of reflection and the infrared light detector depends upon the distance between the sensor and the object, as schematically illustrated in FIG. 1.

High precision proximity sensors exploiting the very fast timing response of GMAP photodiodes (timing jitter<100 ps) are based on the measurement of the timing distribution of the delays between the true arrival time of photons onto the GMAP's active area and the detection time given by the rising edge of the GMAP's output current pulse. These systems usually employ a Time Correlated Single Photon Counting Apparatus (TCSPC) for the high precision measurements with the start signal given by the electrical trigger of the pulsed light source used to illuminate the object and the stop signal given by the GMAP's output signal. The measurement of the average delay between these times allows a precise and accurate measurement of the distance between the light source and the object.

These high precision distance sensors are typically used for night vision mainly in military applications, exploiting the single photon sensitivity in the dark environments of GMAP detectors. They turned out to be extremely complicated, expensive and not fully suitable for commercial applications.

SUMMARY OF THE INVENTION

In order to realize less expensive proximity sensors, the applicant found expedient to implement an architecture in which there are not separated illumination and detection units or a control electronics unit for managing both.

The applicant has found that the dark current of an array of Geiger mode avalanche photodiodes increases when an object is placed in proximity thereof in front of the photodiodes. This property of the arrays of Geiger mode avalanche photodiodes is exploited for realizing a simple and low cost architecture of a proximity sensor, based on an array of Geiger mode avalanche photodiodes.

More precisely, a proximity sensor of this disclosure comprises an integrated array of Geiger mode avalanche photodiodes, each Geiger mode avalanche photodiode comprising an anode contact and a cathode contact, the proximity sensor having a common cathode contact of all the photodiodes of the array that defines a first connection lead at the back side of the array. A common anode collecting grid contact connects in common distributed metal anode contacts of each and all photodiodes of the array to a second connection lead of the array. Circuitry is coupled with the first lead and the second lead, and is configured to sense in operation an increase either of a dark current of the array or of a rate of current spikes generated by the array in dark conditions, and to generate output signals adapted to represent an estimated distance of an object from the array. The estimated distance is shorter the greater the increase of the dark current or of the rate of current spikes in dark conditions with respect to a functioning condition of the proximity sensor far from surrounding objects.

According to the herein disclosed method, the distance of an object from the above defined proximity sensor may be sensed by: inversely biasing the array of Geiger mode avalanche photodiodes, sensing in operation an increase either of a dark current of the array or of a rate of current spikes generated by the array in dark conditions, and generating output signals adapted to represent an estimated distance of an object from the array, the estimated distance being shorter the greater the increase of the dark current or of the rate of current spikes in dark conditions in respect to a functioning condition of the proximity sensor far from surrounding objects.

DETAILED DESCRIPTION OF THE PREFERRED EMBODIMENTS

This disclosure deals with the possibility to use photons randomly emitted in dark conditions from reverse biased GMAP arrays with multiplexed configuration of the microcells electrical contacts (e.g. the Silicon Photomultiplier) to create a monolithic and compact proximity sensor, adapted to operate in high dark environments. In this proximity sensor, the array of GMAP photodiodes is reverse biased above the breakdown voltage such as to make it act at the same time as a detection unit and as illumination unit.

Phenomena of photon emissions by reverse biased p-n junctions have been reported for the first time in 1955. The article by Nader Akil et al, "A multimechanism model for photon generation by silicon junctions in avalanche breakdown", IEEE Transactions on Electron Devices, vol. 46, No. 5, May 1999, provides a survey on the possible mechanisms for the photon emission due to avalanche phenomena in reverse biased p-n junctions.

The presently disclosed proximity sensor exploits the fact that, by reverse biasing the p-n junctions of the photodiodes of its GMAP array, the avalanche phenomenon may be randomly triggered in any photodiode even if no photon has impinged on its junction (dark event), and this avalanche discharge causes the generation of infrared light.

The electrical terminals of the photodiodes of a Geiger Mode Avalanche Photodiode Array are multiplexed such that the array has only one anode and one cathode terminal. Consequently, the array output charge will be given at any time by the analog sum or superposition of the signals produced by all the fired photodiodes, whose avalanche events are quenched by integrated quenching resistors.

The infrared light emitted by the GMAP photodiodes randomly fired by dark events is used to illuminate the object whose distance has to be determined while the light reflected by the same object and impinging on the array will trigger avalanche events in the GMAP photodiodes not fired by dark events, producing a photocurrent signal proportional to the number of absorbed photons in turn proportional to the distance sensor-object. The reverse biased array configuration allows to have at any time a number of GMAP photodiodes, randomly distributed within the array, fired by dark events and acting as illumination points and the rest of the GMAP photodiodes acting at the same time as GMAP detection points thanks to the operation above the breakdown voltage and the multiplexed configuration of the contacts.

Commonly marketed proximity sensors include illumination LEDs and photodetecting diodes, and need separated illumination and detection electric paths because LEDs emit light when directly biased, and photodetecting diodes generate current pulses when they collect photons only when their junctions are reverse biased. Therefore, they need separated illumination and detection units.

Figure 1:
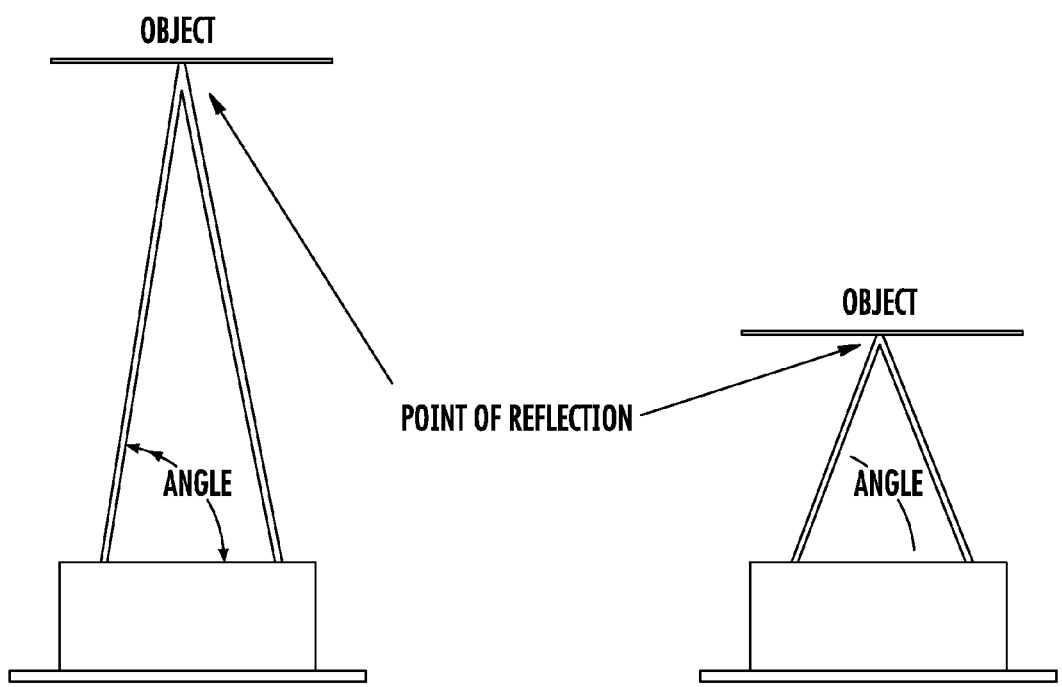
FIG. 1 illustrates different reflection angles for different distances from the sensor of a reflecting object.
Figure 2:
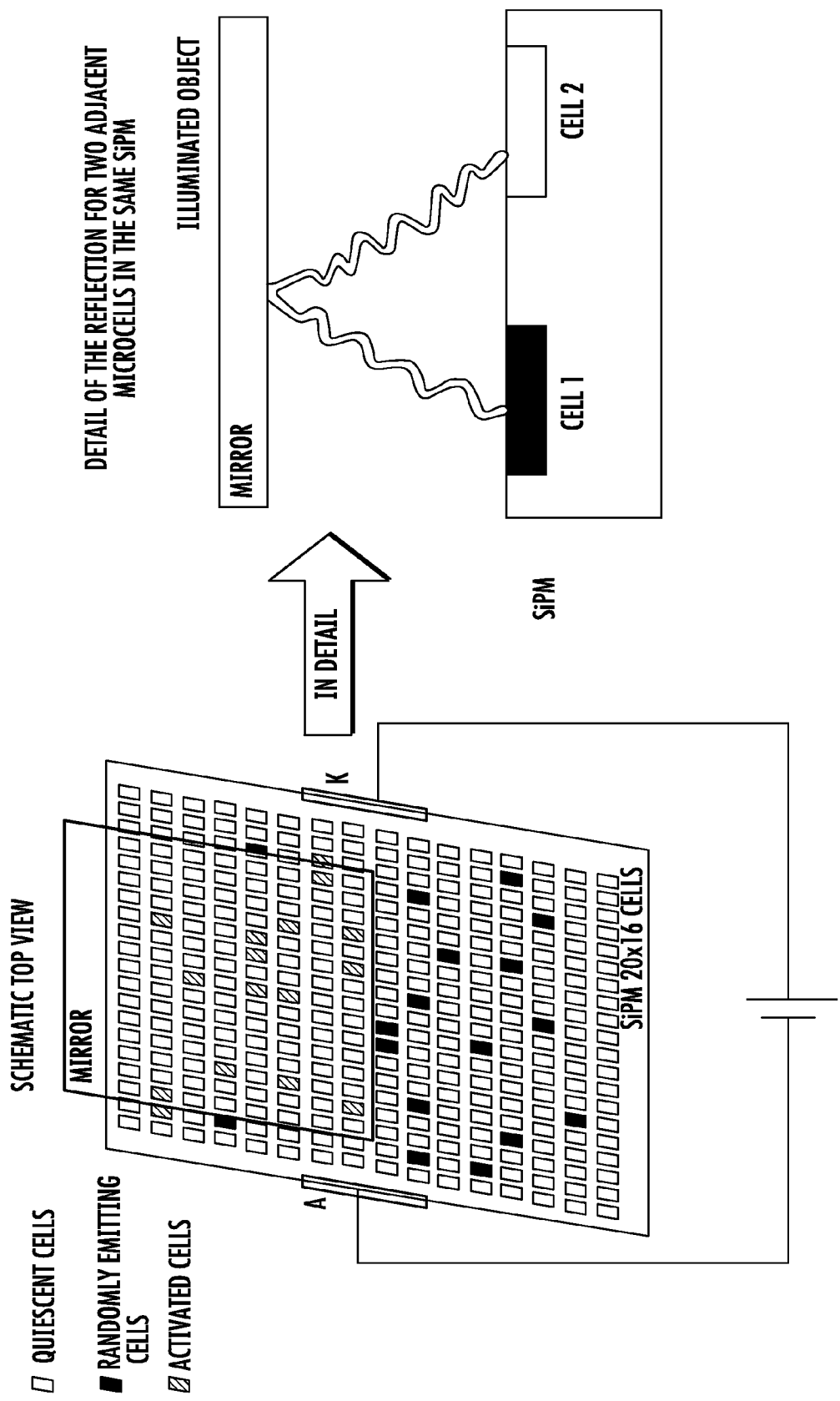
FIG. 2 illustrates the working principle of the optical proximity sensor based on Silicon Photomultiplier according to this disclosure.

By contrast, in the proximity sensor of this disclosure all the GMAP photodiodes may be reverse biased, have their terminals connected in common and need not separate the illumination and detection units because they may indifferently act as infrared light emitters or infrared light detectors. The working principle is illustrated in FIG. 2.

Each single photodiode has a quenching resistor that allows quenching of the breakdown current of the respective photodiode, while the other GMAP photodiodes remain inversely biased.

Figure 3:
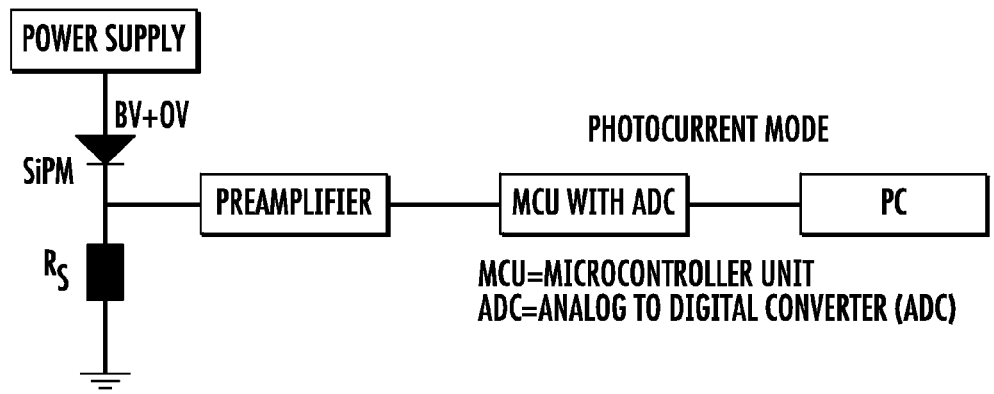
FIG. 3 illustrates a driving and readout electronics for a SiPM optical proximity sensor working in photocurrent mode.
Figure 4:
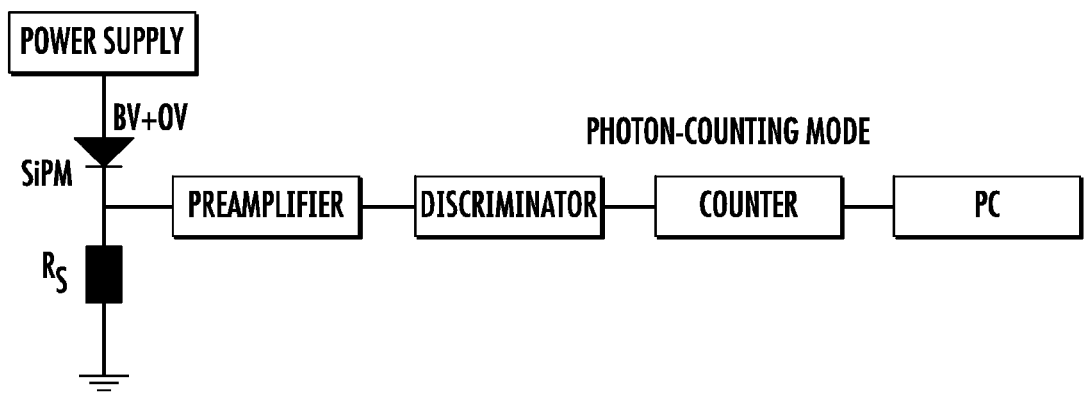
FIG. 4 illustrates a driving and readout electronics for a SiPM optical proximity sensor working in photon-counting mode.
Figure 5:
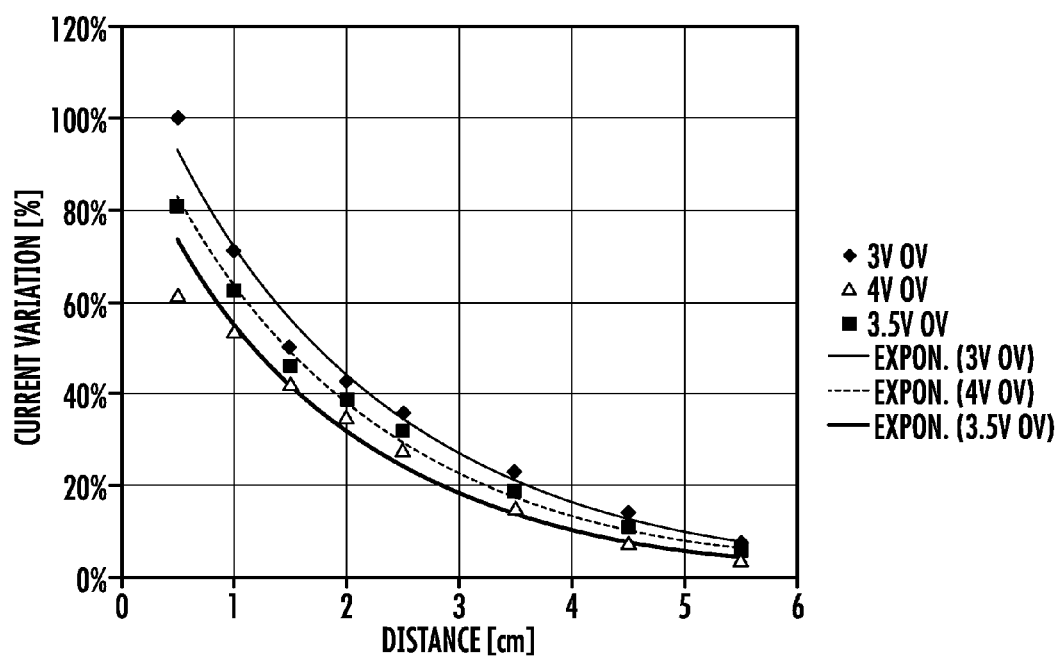
FIG. 5 is a graph of percentage variation of SiPM's photocurrent over the dark current values induced as a function of the OV and distance mirror/detector.

FIGS. 3 and 4 depict architectures of proximity sensors and of the circuitry, coupled to the photodiodes, for sensing the mean dark current or the rate of current spikes generated by the array of photodiodes in dark functioning conditions. In these exemplary architectures, the current generated by the array of photodiodes is sensed using a sense resistor Rs connected in series with the array, though it is not mandatory to use a sense resistor, because the current may be sensed using a current sensor of any type. Preferably, the sense voltage on the sense resistor Rs is amplified by an amplifier that generates a corresponding sense signal, that, in turn, is processed to estimate a distance of an object from the proximity sensor.

According to the architecture of FIG. 3, the output current signal is sampled at an appropriate sampling rate using an analog-to-digital converter ADC, eventually after a conversion of the current into a voltage signal using a transimpedence amplifier.

According to an alternative embodiment depicted in FIG. 4, thanks to the excellent single photon counting capability of the GMAP array that makes it particularly suitable for the operation in a high dark condition, the detected photons (i.e. fired GMAP photodiodes, that cause current spikes in dark functioning conditions) are counted by using a discriminator, to select avalanche events whose amplitude is higher than a fixed threshold, and a counter to count them.

In order to show that a GMAP array may be configured to be used in a proximity sensor, let us consider an exemplary case of a GMAP array of 1 mm$^2$ area with 400 microcells and operated at a 5 V overvoltage (5 V OV) above the By. The typical dark noise rate density is about 1MHz (corresponding to a dark current density of 0.8 μA, assuming a gain of $5 \times 10^6$ at 5V OV). This means that each second the cells are fired by dark count events $10^6$ times. Assuming that 3 photons are emitted every $10^5$ generated carriers, 150 photons will be emitted on average by each avalanching junction and assuming the dark rate value mentioned above, a rate of about $1.5 \times 10^8$ photons/sec will be emitted by the whole array. Not all the generated photons will be capable of exiting from the device, because of the phenomenon of "total internal reflection", but only the photons impinging on a separation surface between the device and the surrounding air with an incidence angle smaller than or equal to the critical angle.

It is thus estimated that, in the considered exemplary case, about $2.25 \times 10^6$ photons/sec out of the generated $1.5 \times 10^8$ photons/sec will be emitted outside of the device and will be potentially able to reach the surface of an object whose distance from the sensor has to be determined. Assuming for example that the reflectivity of the object is 50% at the illumination wavelength and that all the light reflected by the object is collected by the GMAP array, a reflected photons rate of $1.12 \times 10^6$ photons/sec will impinge on the GMAP area. Supposing a GMAP Photon Detection Efficiency (PDE) of about 30% at 800 nm, about $3.4 \times 10^5$ photons/sec will be detected by the sensor; corresponding to a photocurrent value of about 0.27 μA to be compared with a dark current value of 0.8 μA. This photocurrent value may be easily distinguishable from the dark rate, confirming that the sensitivity of the proposed sensor is sufficient to measure the variation of incident photon fluxes in a wide range of operating conditions (and consequently over a wide range of distances object/sensor).

In order to further enhance the percentage of photons capable of exiting from the device, the sensing surface of the proximity sensor may be coated with silicone resins, that have an intermediate refraction index between those of the air and of the silicon.

The suitability of this approach has been experimentally tested by measuring the variation of the dark current induced on a 4.0×4.5 mm² area SiPM (1750 microcells, 66% fill factor, 82 µm active area side) biased in the range 3V-4V OV above the breakdown voltage (28V) by the absorption of photons emitted by the same detector and reflected by a mirror placed at different distances (d) from the sensor's surface. The measured data are reported in FIG. 6 as a percentage variation of the photocurrent produced by the reflected light over the dark current measured at different OV values as a function of the distance between the SiPM and the illuminated object. An inverse dependence of the dark current on the distance mirror/detector has been experimentally found for all the considered OV values. Moreover the variation of the dark current is on the order of a few µA, thus easily distinguishable from the intrinsic dark current of the photodiode (a few tens of µA at the tested overvoltage) and in good agreement with the theoretical calculations presented above. An inverse dependence of the photocurrent increase with the distance has been experimentally found. The increase of the photocurrent produced by the reflected light with respect to the dark current level turns out to be correlated to the overvoltage applied to the device. The higher the OV, the higher the number of microcells fired by dark count and the number of emitted photons and the lower the number of microcells available for the detection of reflected light. This saturation effect can be exploited to change the sensitivity of the optical proximity sensor over different distance ranges. More particularly the application of a lower OV makes the proximity sensor more sensitive in the short distance range. This same effect can be obtained by using SiPM arrays with a lower number of microcells (larger active area and higher fill factor). This means that the sensitivity of the optical proximity sensor over different distance ranges can be adjusted through the variation of layout parameters and experimental conditions.

One can think to improve the illumination efficiency of the light emitter by depositing on the silicon surface a suitable encapsulating layer with refraction index in between those of silicon and air (e.g. silicone (n=1.5)), increasing in this way the fraction of generated photons exiting the detector's surface and improving in this way the overall efficiency of the optical proximity sensor approach proposed herein. The resin can be dispensed only on limited portions of the detector increasing in this way the emission efficiency in selected areas of the detector. Moreover the device could be coupled to beam splitters to measure simultaneously the average distance of two or more objects placed in different directions (e.g. perpendicular sidewalls) or focusing lenses to increase the efficiency in the detection of the reflected light.

The approach is based on a unique and monolithic device acting simultaneously as the light emitting and detection units and allows the miniaturization of the optical proximity sensor block. Moreover the electronics and packaging issues are also remarkably simplified.

The multipixel configuration allows having at any time pixels available as light emitters and light detectors. This avoids the saturation of the signal for high impinging reflected fluxes typical of single pixel detectors operating above the breakdown voltage. Moreover the multiplexed configuration of the contacts allows reading the variation of the current due to the absorption of the reflected photon flux through simple photocurrent measurements or for devices operating in a photo-counting regime through a discriminator and a counter. Finally the single photon sensitivity of GMAP detectors allows high precision distance measurements in high dark environments.

According to yet another embodiment, not depicted in the figures, the herein disclosed proximity sensor is equipped with lenses, placed at a distance from the photodiodes, oriented for focusing photons, destined to impinge against the sensing surface of the sensor, on a pre-established sub-set of photodiodes of the proximity sensor. This particular arrangement could be useful for example for determining the distance of objects with reduced reflectivity. Indeed, concentrating towards a specific subset of photodiodes photons reflected by the object is expedient to increase the generate dark currents or the rate of firing photodiodes.

According to a yet another embodiment, not depicted in the figures, the presently disclosed proximity sensor may include a plurality of separated arrays of GMAP photodiodes disposed in different locations of a same substrate in order to detect the shape of a near non-planar object. In this particular embodiment, the cathode contacts of all the photodiodes are connected to a first lead contact of the proximity sensor. The anode contacts of the photodiodes belonging to a same array are connected to a respective second connection lead of the array, the anode contacts of the arrays being not connected in common, but being individually selectable through a multiplexer. The circuitry of the proximity sensor for sensing an increase of the dark current or of the rate of firing photodiodes is coupled with the first lead, to which all cathode contacts are connected, and with the output of the multiplexer.

With this arrangement, it is possible to read the dark current of each single array of photodiodes of the proximity sensor, and thus to estimate the distance of an object from each array of the proximity sensor. By collecting all information provided by the arrays, it is possible to obtain information about the shape of the object and/or to know how it is oriented in respect to the proximity sensor.

The GMAP photodiodes of a same array or even of different arrays may be integrated on a same silicon substrate.

The possible applications of this approach span from profilometry (study of surface roughness) to the mapping of grooves in the land and 3-D imaging, all of which requiring a high sensitivity in high dark environments.

That which is claimed is:
1. A proximity sensor comprising:
an array of Geiger mode avalanche photodiodes, each Geiger mode avalanche photodiode comprising an anode contact and a cathode contact;
a common cathode contact coupled to said cathode contacts of said array of Geiger mode avalanche photodiodes to define a first connection lead at a back side of said array of Geiger mode avalanche photodiodes;
a common anode collecting grid contact coupled to said anode contacts of said array of Geiger mode avalanche photodiodes to define a second connection lead of said array of Geiger mode avalanche photodiodes; and
circuitry coupled with said first and second connection leads and configured to
sense at least one of a dark current and a rate of current spikes generated in dark conditions, and
generate an output signal representing an estimated distance of an object from said array of Geiger mode avalanche photodiodes based upon the sensing of an increase of the dark current or the rate of current spikes with respect to a functioning condition of said array of Geiger mode avalanche photodiodes far from surrounding objects.

2. The proximity sensor according to claim 1 wherein said circuitry further comprises:
- a current sensor coupled with the first and second connection leads and configured to generate sense signals representing the dark current flowing throughout said array of Geiger mode avalanche photodiodes; and
- a microcontroller unit coupled with said current sensor and configured to receive the sense signals and generate the output signal.

3. The proximity sensor according to claim 2 wherein said current sensor comprises:
- a sense resistor coupled with said array of Geiger mode avalanche photodiodes; and
- an amplifier coupled to said sense resistor and configured to generate the sense signals as an amplified replica of a voltage on said sense resistor.

4. The proximity sensor according to claim 1 wherein said circuitry is configured to sense an increase of a rate of firing Geiger mode avalanche photodiodes in dark conditions and comprises:
- a pulse discriminator coupled with the first and second connection leads and configured to generate rectangular pulses representing the current spikes;
- a counter coupled with said pulse discriminator and configured to count the rectangular pulses representing the current spikes and to generate a corresponding counting of the current spikes; and
- a microprocessor coupled with said counter and configured to receive the counting and to generate the output signal.

5. The proximity sensor according to claim 1 wherein each Geiger mode avalanche photodiode comprises a quenching resistor inserted in an electric path from said anode contact to said cathode contact.

6. The proximity sensor according to claim 1 wherein said array of Geiger mode avalanche photodiodes have a sensing surface; and further comprising a layer of a silicone resin on said sensing surface with a thickness to define a quarter-wave antireflection layer for photons of infrared light.

7. The proximity sensor according to claim 1 wherein said array of Geiger mode avalanche photodiodes is integrated on a same silicon substrate.

8. A proximity sensor comprising:
- an array of Geiger mode avalanche photodiodes, each Geiger mode avalanche photodiode comprising an anode contact and a cathode contact;
- a common cathode contact coupled to said cathode contacts of said array of Geiger mode avalanche photodiodes to define a first connection lead;
- a common anode contact coupled to said anode contacts of said array of Geiger mode avalanche photodiodes to define a second connection lead; and
- circuitry coupled with said first and second connection leads and configured to sense a dark current, and generate an output signal representing an estimated distance of an object from said array of Geiger mode avalanche photodiodes based upon an increase of the sensed dark current with respect to a functioning condition of said array of Geiger mode avalanche photodiodes far from surrounding objects.

9. The proximity sensor according to claim 8 wherein said circuitry comprises:
- a current sensor coupled with the first and second connection leads and configured to generate sense signals; and
- a microcontroller unit coupled with said current sensor and configured to receive the sense signals and generate the output signal.

10. The proximity sensor according to claim 9 wherein said current sensor comprises:
- a sense resistor coupled with said array of Geiger mode avalanche photodiodes; and
- an amplifier coupled to said sense resistor and configured to generate the sense signals as an amplified replica of a voltage on said sense resistor.

11. A proximity sensor comprising:
- an array of Geiger mode avalanche photodiodes, each Geiger mode avalanche photodiode comprising an anode contact and a cathode contact;
- a common cathode contact coupled to said cathode contacts of said array of Geiger mode avalanche photodiodes to define a first connection lead;
- a common anode contact coupled to said anode contacts of said array of Geiger mode avalanche photodiodes to define a second connection lead; and
- circuitry coupled with said first and second connection leads and configured to sense a rate of current spikes generated in dark conditions, and generate an output signal representing an estimated distance of an object from said array of Geiger mode avalanche photodiodes based upon an increase of the sensed rate of current spikes with respect to a functioning condition of said array of Geiger mode avalanche photodiodes far from surrounding objects.

12. The proximity sensor according to claim 11 wherein said circuitry comprises:
- a current sensor coupled with the first and second connection leads and configured to generate sense signals; and
- a microcontroller unit coupled with said current sensor and configured to receive the sense signals and generate the output signal.

13. The proximity sensor according to claim 12 wherein said current sensor comprises:
- a sense resistor coupled with said array of Geiger mode avalanche photodiodes; and
- an amplifier coupled to said sense resistor and configured to generate the sense signals as an amplified replica of a voltage on said sense resistor.

14. The proximity sensor according to claim 11 wherein said circuitry comprises:
- a pulse discriminator coupled with the first and second connection leads and configured to generate pulses representing the current spikes;
- a counter coupled with said pulse discriminator and configured to count the pulses representing the current spikes and to generate a corresponding counting of the current spikes; and
- a microprocessor coupled with said counter and configured to receive the counting and to generate the output signal.

15. A method of sensing a distance of an object from a proximity sensor comprising:
- inversely biasing an array of Geiger mode avalanche photodiodes;
- sensing at least one of a dark current and a rate of current spikes generated by the array of Geiger mode avalanche photodiodes in dark conditions; and
- generating an output signal representing an estimated distance of an object from the array based upon the sensing of an increase of the dark current or the rate of current spikes with respect to a functioning condition of the array of Geiger mode avalanche photodiodes far from surrounding objects.

* * * * *